April 16, 1963  R. J. HOTCHKISS, JR  3,085,634
TOOTH DRAG ATTACHMENT
Filed April 17, 1959  6 Sheets-Sheet 1

FIG.1

INVENTOR.
ROBERT J. HOTCHKISS, Jr.
BY
McMorrow, Berman & Davidson
ATTORNEYS

April 16, 1963 R. J. HOTCHKISS, JR 3,085,634
TOOTH DRAG ATTACHMENT
Filed April 17, 1959 6 Sheets-Sheet 2

INVENTOR.
ROBERT J. HOTCHKISS, JR.
BY
McMorrow, Berman & Davidson
ATTORNEYS

April 16, 1963

R. J. HOTCHKISS, JR

3,085,634

TOOTH DRAG ATTACHMENT

Filed April 17, 1959

INVENTOR.
ROBERT J. HOTCHKISS, JR.

BY

McMorrow, Berman + Davidson
ATTORNEYS

April 16, 1963 R. J. HOTCHKISS, JR 3,085,634
TOOTH DRAG ATTACHMENT
Filed April 17, 1959 6 Sheets-Sheet 5

INVENTOR.
ROBERT J. HOTCHKISS, JR.
BY
McMorrow, Berman & Davidson
ATTORNEYS

April 16, 1963  R. J. HOTCHKISS, JR  3,085,634
TOOTH DRAG ATTACHMENT
Filed April 17, 1959

INVENTOR.
ROBERT J. HOTCHKISS, JR.
BY
McMorrow, Berman + Davidson
ATTORNEYS

United States Patent Office 3,085,634
Patented Apr. 16, 1963

3,085,634
TOOTH DRAG ATTACHMENT
Robert J. Hotchkiss, Jr., P.O. Box 98, Bradford, Ill.
Filed Apr. 17, 1959, Ser. No. 807,089
5 Claims. (Cl. 172—180)

The present invention relates to a tooth drag attachment for a disc harrow.

Presently in use are disc harrows which are wheel mounted and which enable the operator thereof to raise the discs above the ground surface by lowering the wheels of the harrow, the lowering of the wheels being accomplished by either hydraulic or other power means. A generally accepted practice is to trail a drag behind the disc harrow for leveling and further working of the soil disced by the harrow. Such drags may be of the spike tooth, spring tooth, or other variety. Heretofore, the connection means between such a drag and the associated harrow has been flexible, and has generally consisted in chains or the like. Such a connection means has not permitted either raising of the drag above the ground surface or backing up of the harrow and the attached drag. The raising of the drag with the harrow above the ground surface is frequently desirable for the purpose of traversing waterways, roadways, or the like. Also, backing up of the harrow and attached drag is frequently necessary when maneuvering the harrow, towing vehicle, and attached drag in restricted areas, around corners, into and out of implement shelters, and elsewhere.

An object of the present invention is to provide a tooth drag attachment for a disc harrow which enables the operator of the harrow to back up the harrow and attached drag when desired.

Another object of the present invention is to provide a tooth drag attachment for a disc harrow which enables the operator of the harrow to raise the drag attachment with the harrow above a ground surface when desired.

A further object of the present invention is to provide a tooth drag attachment which is adapted for pivotal attachment to a wheel carrying element of a disc harrow.

A still further object of the present invention is to provide a tooth drag attachment for a harrow in which the teeth serve as runners when the drag is moved backward, lifting the drag attachment out of the ground surface and permitting the cleaning of the drag attachment and the associated disc harrow of debris.

A still further object of the present invention is to provide a tooth drag attachment in which pressure applying means is associated with the draw bars to increase the pressure of the teeth upon the soil being worked.

A still further object of the present invention is to provide a tooth drag attachment which has an extendable and retractable extension.

Yet another object of the present invention is to provide a tooth drag attachment for a disc harrow which is positive in operation, one sturdy in construction, one economically fabricated of conventional materials, and one which is highly effective in action.

These and other objects and advantages of the present invention will be fully apparent from the following description when taken in conjunction with the annexed drawings, in which.

Figure 1:
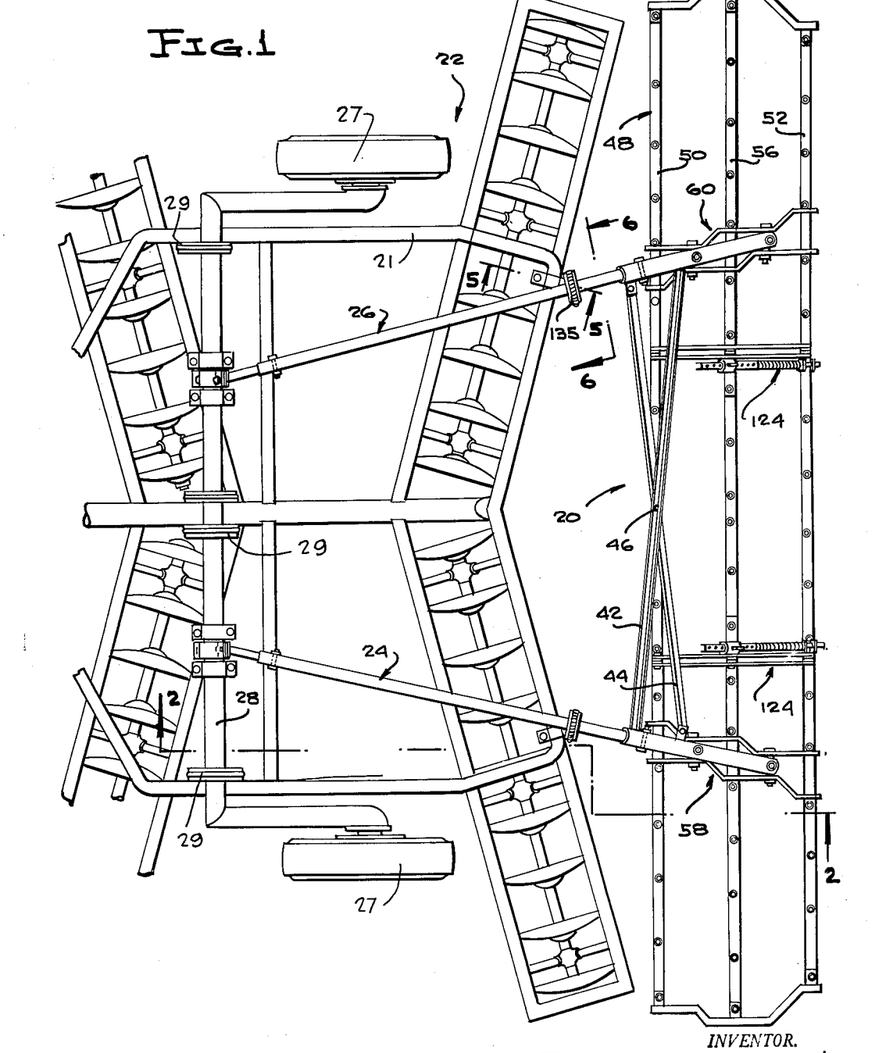
FIGURE 1 is a plan view of the tooth drag attachment of the present invention shown in position behind a disc harrow and attached thereto, portions of the forward part of the harrow being shown broken away.
Figure 2:
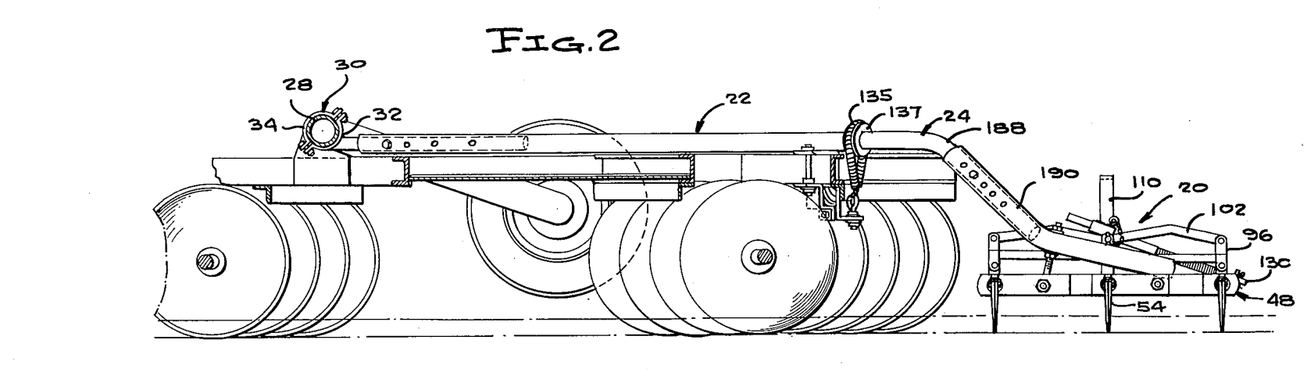
FIGURE 2 is a view taken on the line 2—2 of FIGURE 1.

Referring in greater detail to the drawings in which like numerals indicate like parts throughout the several views, in FIGURES 1 and 2, the tooth drag attachment of the present invention is designated generally by the reference numeral 20 and is shown in tandem relation with respect to a disc harrow 22. A pair of transporting wheels 27 are positioned transversely of the frame 21 of the disc harrow 22 between the forward and rearward ends thereof, and are normally spaced above a ground surface. A wheel-carrying element 28 is swingable about a fixed transverse pivot axis on laterally-spaced trunnions 29 on the frame 21, and connects the wheels 27 together for pivotal movement of the wheels from the normal position above the ground surface to a transporting position on the ground surface.

The attachment 20 comprises at least two draw bars 24 and 26 arranged in lateral spaced relation and extending horizontally over and in contact with the frame 21 of the harrow 22 when the transporting wheels 27 are in the normal position spaced above a ground surface.

Figures 3, 4:
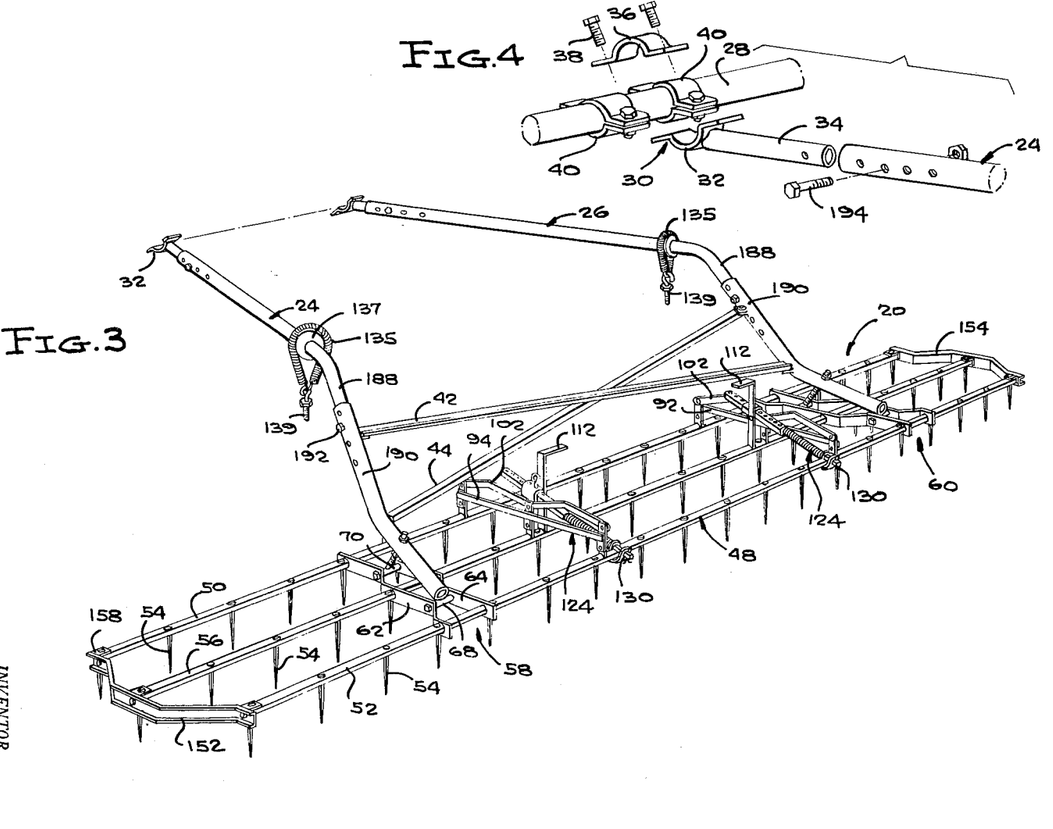
FIGURE 3 is an isometric view of the attachment of the present invention, shown detached from the disc harrow.
FIGURE 4 is an isometric exploded view of the attaching means employed to secure the device of the present invention to the disc harrow.

The complemental one ends of the draw bars 24 and 26 are provided with means for pivotal attachment to the the wheel carrying element of the harrow 22. This means is shown in FIGURE 4 with reference to the draw bar 24, the element of the harrow 22 being designated by the numeral 28. Specifically, this means consists in a split collar 30 having a lower section 32 fixedly secured by welding or other means to one end of a stub member 34. The stub member 34 is adjustably and telescopically arranged within the adjacent end of the draw bar 24. The collar 30 has an upper section 36 which stradlles the element 28 of the harrow 22 and is secured by bolts 38 to the collar section 32.

Positioning collars 40 on each side of the collar 30 are secured to the element 28 and prevent lateral movement of the draw bar 24 on the element 28. The collar 30 permits pivotal up and down movement of the draw bar 24 about the element 28 as an axis. It is to be understood that the other draw bar 26 is similarly attached to the element 28 of the harrow 22.

Means is provided connecting the draw bars 24 and 26 so as to maintain the draw bars 24 and 26 in rigid lateral spaced relation. Specifically, this means includes a pair of brace bars 42 and 44 arranged in criss-cross relation and positioned between the draw bars 24 and 26 intermediate the ends of the latter with the free ends attached to the draw bars 24 and 26 connecting the latter together so as to maintain the draw bars 24 and 26 in rigid lateral spaced relation. As shown in FIGURE 1, the brace bars 42 and 44 are connected together by a bolt 46 at their cross-over point.

The attachment 20 includes a tooth unit 48 positioned transversely of and carried by the draw bars 24 and 26, the unit 48 having at least two tooth carrying bars 50 and 52 arranged in tandem spaced relation. Each bar 50 and 52 has a plurality of teeth 54 arranged in spaced relation therealong and carried by the respective bar 50 or 52.

Another tooth carrying bar 56 is arranged in parallel relation between the bars 50 and 52 and also carries a plurality of spaced teeth 54.

At least two holding means are operatively connected to the bars 50, 52, 56, for maintaining the bars 50, 52, 56, in fixed tandem relation. These holding means are designated generally by the reference numerals 58 and 60 in FIGURE 3.

Figure 11:
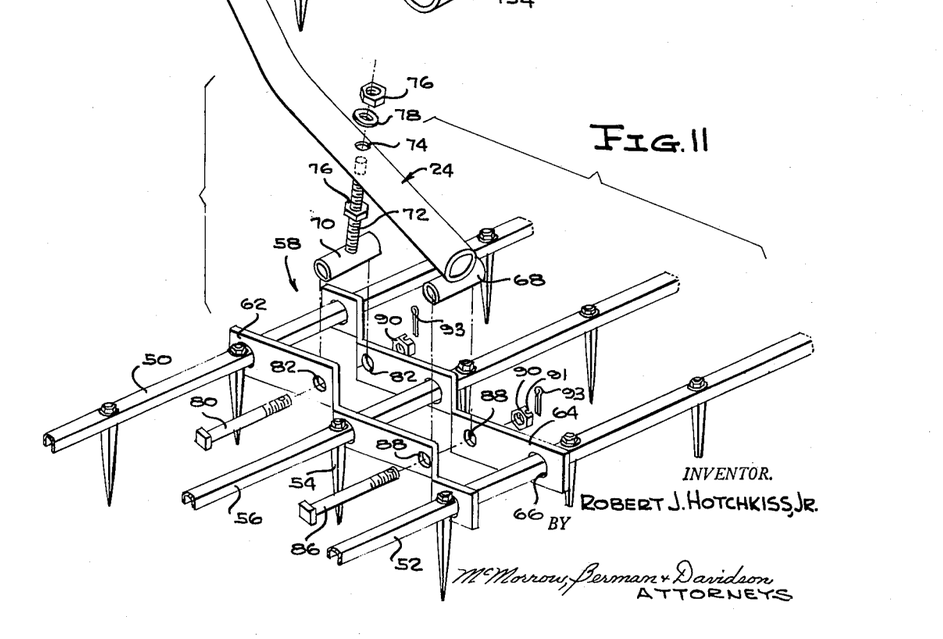
FIGURE 11 is a further isometric exploded view of the means connecting the tooth carrying bars to the draw bars.

The one holding means 58 is shown in detail in FIGURE 11 and it is to be understood that the holding means 60 is identical thereto. Specifically, this holding means 58 consists in a pair of laterally spaced spacer plates 62 and 64 having holes 66 therethrough supporting the bars 50, 52, and 56. The spacer plates 62 and 64 of each holding means 58 and 60 are identical and will be described with reference to the holding means 58.

As shown in FIGURE 11, a horizontally disposed sleeve 68 is arranged transversely of the lower end of the draw bar 24 and is fixedly secured thereto by welding or other means. Another sleeve 70 is positioned in parallel spaced relation forwardly of the sleeve 68 and is secured on the lower end of an upright stud 72 which has a portion adjacent its upper end extending through aligned holes 74 provided in the draw bar 24. Lock nuts 76 and a lock washer 78 secure the stud 72 in any position of its adjusted upward or downward movement. A bolt 80 extends through aligned holes 82 provided in the spacer plates 62 and 64 and through the sleeve 70. Another bolt 86 extends through aligned holes 88 in the spacer plates 62 and 64 and through the sleeve 68. Nuts 90 having slots 91 are on the threaded end portions of the bolts 80 and 86 and secure the bolts 80 and 86 in the sleeves 68 and 70. Cotter pins 93 secure the nuts 90 to the bolts 80 and 86 after the nuts 90 have been tightened on the bolts 80 and 86, drawing the spacer plates 62 and 64 tightly against the ends of the sleeves 68 and 70.

It is to be noted that spacer means are distributed in spaced relation along the tooth carrying bars 50, 52 and 56 of the tooth unit 48, and the spacer means supports one of the drawbars 24 and 26 at two spaced bearing points with respect to one of the tooth carrying bars, namely, bar 56, for more widely diffusing the bearing of either of the drawbars 24 and 26 on the tooth carrying bar 56. The spacer means serves to increase the number of bearing points along the tooth carrying bars 50, 52 and 56, of the tooth unit 48, without confining the spread of the bearing points between adjacent teeth, as illustrated, but promoting a wide spread of bearing points to permit use of the lightest or most resilient tooth carrying bar possible. Also, the connecting means supports the disposition of the drawbar 24 or 26 with respect to the spacer means. The connecting means is a two-point connecting means which is disposed intermediate the tooth carrying bars 50, 52, and 56, at least one of the connecting means on at least one of the drawbars being adjustable so as to permit adjustment of the disposition of the plane of the tooth unit 48 with respect to at least one drawbar. Specifically, the two-point connecting means comprises sleeve 68 fixed to one of the ends of the drawbars 24 and 26 and the sleeve 70 adjustably carried by the drawbars 24 and 26, the sleeves 68 and 70 being secured to the spacer means or spacer plates 62 and 64 which are distributed in spaced relation along and are carried on the tooth carrying bars 50, 52 and 56, of the tooth unit 48.

Figure 8:
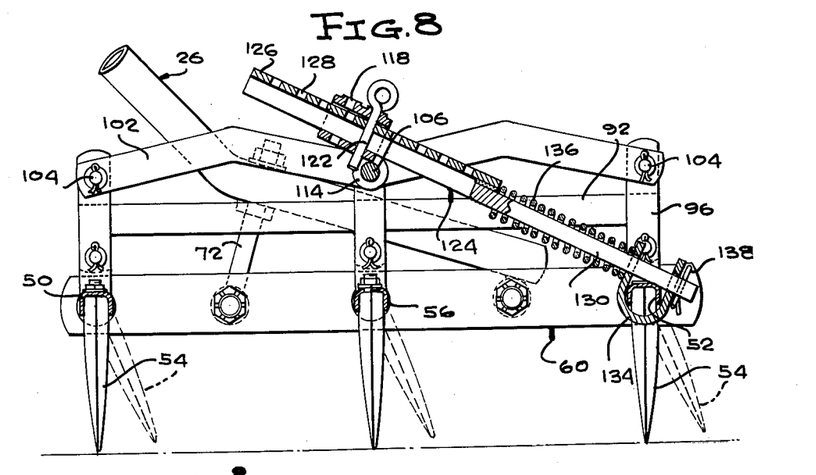
FIGURE 8 is a view taken on the line 8—8 of FIGURE 7, teeth of the drag being shown in vertical position in full lines, and in rearwardly pitched positions in dotted lines.
Figure 9:
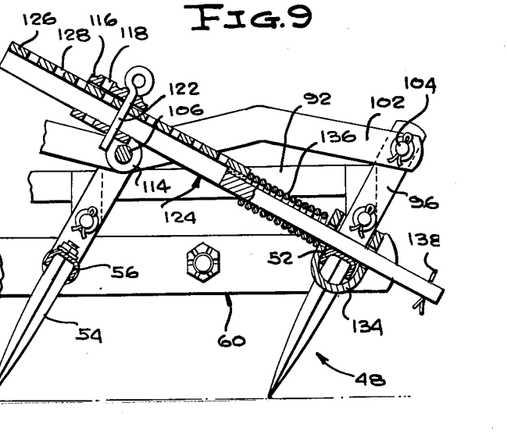
FIGURE 9 is a fragmentary view similar to FIGURE 8, the teeth being shown in reverse pitch position.

Means is provided operatively connecting the tooth carrying bars 50, 52, and 56, permitting the teeth 54 of the bars 50, 52, and 56 to engageably contact the soil to be tilled in a rearward pitch, as shown in dotted lines in FIGURE 8, in the forward travel of the unit 48, assuming a reverse pitch of a degree such as to float the unit 48 on the soil, as shown in FIGURE 9, in the backward travel of the unit 48, and returning to the coil engaging position on resumption of the normal forward travel of the unit 48.

Figure 10:
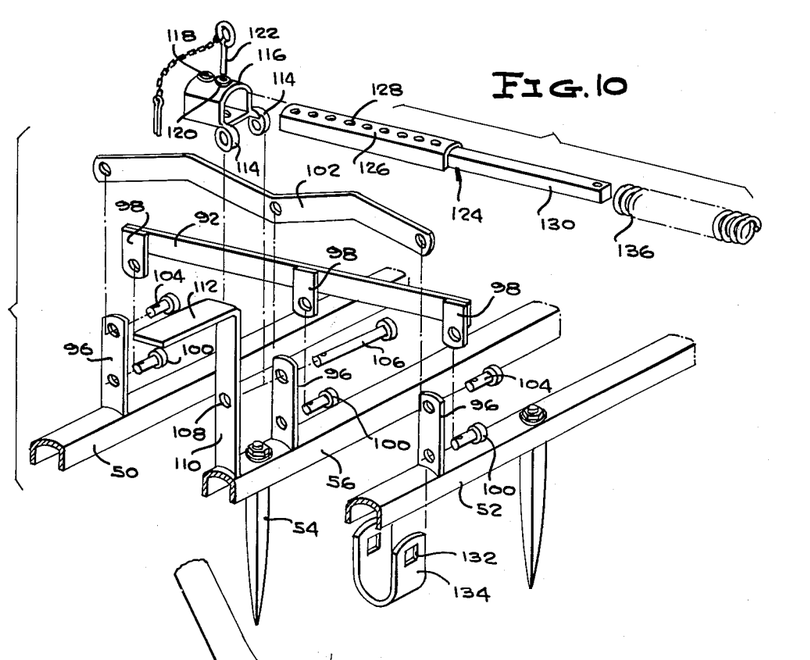
FIGURE 10 is an exploded isometric view of the means connecting the tooth carrying bars of the drag together for simultaneous rotary movement from the position shown in FIGURE 8 to the position shown in FIGURE 9.

Specifically, this means consists in spaced connector bars 92 and 94 (FIGURE 3), each positioned inwardly of the ends of the unit 48 and each pivotally connected to the bars 50, 52, and 56, for simultaneous rotary movement of the latter to shift the teeth 54 from the upright position to a position at an angle to the upright position. An arm 96 projects upwardly from each of the bars 50, 52, and 56 below each of the bars 92 and 94, as shown in FIGURE 10, with reference to the bar 92. Lugs 98 depend from the bar 92 and pins 100 connect the lugs 98 to the adjacent arms 96 inwardly of the lower end of each of the latter. The means also includes an actuator bar 102 positioned in superimposed spaced relation with respect to the bars 92 and 94, as shown in FIGURE 10. With reference to the bar 92, the bar 102 is pivotally connected by pins 104 to the arms 96 of the tooth carrying bars 50 and 52, and by another pin 106 to the arm 96 of the tooth carrying bar 56. The pin 106 also extends through a hole 108 in the intermediate part of an operating arm 110 having a handle 112 on its upper end. The handles 112 face each other as shown in FIGURE 3.

The pin 106 also extends through spaced trunnions 114 depending from the rearward end of a saddle element 116. The saddle element 116 is provided with a pair of holes 118 and 120 for selective insertion therein of a securing pin 122.

A tie bar 124 has an enlarged end portion 126 conformably shaped to slide within the saddle element 116. The portion 126 is provided with a plurality of spaced holes 128 one of which receives the securing pin 122, adjustably securing the saddle element 116 on the tie bar 124.

The other end portion 130 of the tie bar 124 extends slidably through aligned holes 132 in the legs of a U-shaped connector 134. The bight of the connector 134 receives the adjacent portion of the tooth carrying bar 52, as shown in FIGURE 10.

Upon rearward movement of the unit 48, as shown in FIGURE 9, the tie bar portion 130 extends through the holes 132 in the connector 134 so as to project rearwardly of the connector 134, permitting pivotal movement of the teeth 54 from the soil contacting position, shown in dotted lines in FIGURE 8 to the position shown in FIGURE 9 in which the teeth 54 are in a reverse pitch position.

Positive means is provided operably connected to the tooth carrying bars 50, 52, and 56, actuable to assist in returning the teeth 54 to the rearward soil engaging pitch position on resumption of the normal forward travel of the unit 48.

Specifically this means consists in a coil spring 136 circumposed about the portion 130 of the tie bar 124 and bearing against the adjacent leg of the connector 134 and against the end of the enlarged portion 126 of the tie bar 124.

A cotter pin 138 in the free end portion of each of the tie bar portions 130 prevents sliding movement of the portion 130 completely out of the holes 132 in the connector 134.

An extensile and retractile means is supported on each of the draw bars 24 and 26 intermediate the ends thereof and is adapted to be connected to the frame of the harrow 22. This means is shown most clearly in FIGURES 5 and 6 and consists of an elongated coil spring 135 having the intermediate portion supported on a spool element 137 mounted upon the adjacent part of the draw bar 24, 26. The free ends of each coil spring 135 are connected to the eye of an eyebolt 139 which is mounted in a bracket 140 projecting rearwardly from the frame 142 of the harrow 22. This structure is seen most clearly in FIGURE 5 with reference to the spool element 137 on the draw bar 26, it being understood that the same structure is carried by the other draw bar 24.

Figure 5:
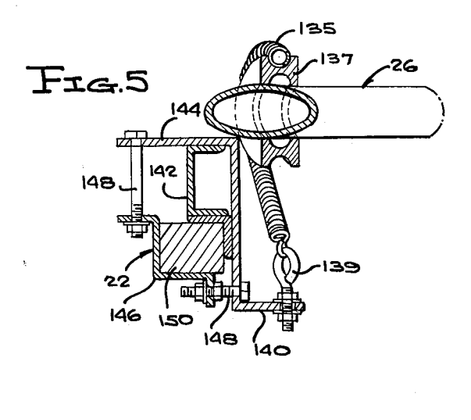
FIGURE 5 is a view on an enlarged scale, taken on the line 5—5 of FIGURE 1.
Figure 6:
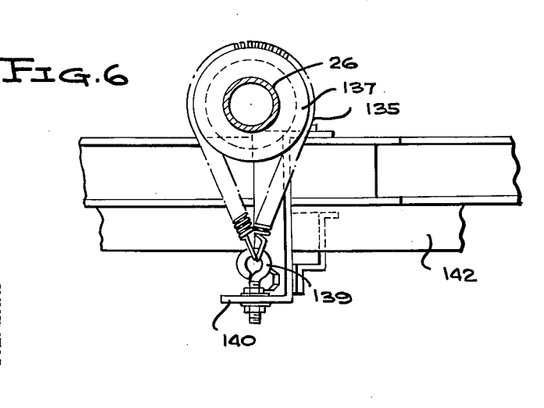
FIGURE 6 is a view on an enlarged scale, taken on the line 6—6 of FIGURE 1.
Figure 7:
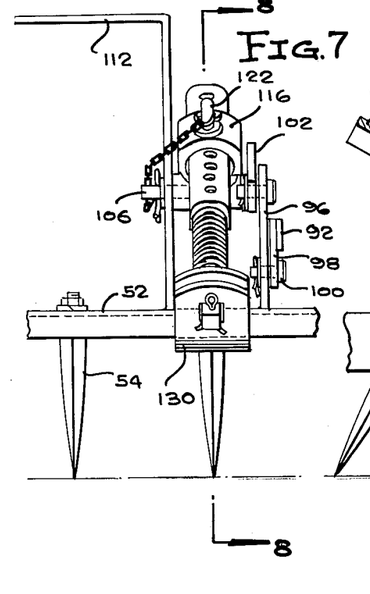
FIGURE 7 is an elevational view, viewed from the rear, of a portion of the assembly shown in FIGURE 1.

The bracket 140 is a shelf portion of a first clamp section 144 which, with another section 146, is adjustably clamped, with bolt and nut assemblies 148, about the adjacent portion of the frame 142. A filler block 150 is employed to fill out the space within the U-shaped frame member constituting the frame 142 in order to rigidly support the bracket 140 on the harrow 22. This support of the eyebolt 139 on the harrow 22 may be varied according to the structural differences which will be found when adapting the drag attachment of the present invention to other harrows.

Figures 13, 14:
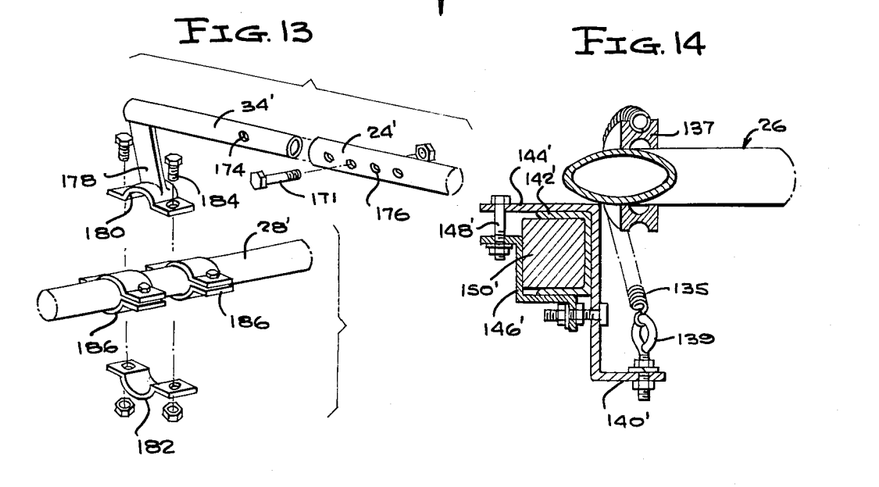
FIGURE 13 is an isometric exploded view of a modified form of the means connecting one of the draw bars to the wheel carrying element of the harrow.
FIGURE 14 is an isometric view partially in section of the resilient means connecting one of the draw bars to the frame of the harrow.

For instance, in FIGURE 14, the frame of the harrow, designated by the numeral 142', is U-shaped in configuration and the filler block 150' is employed to support one of the bracket sections 146' on one side of the filler block 150' while the other section 144' overlies one leg and the bight of the adjacent portion of the frame of the harrow. Bolt and nut assemblies 148' secure the sections 144' and 146' together and the bracket 140' supports the eyebolt 139.

Referring to FIGURE 3, the ends of the tooth carrying bars 50, 52, 56, are connected by specially formed channel members 152 and 154. Angle-shaped lug elements 158 are secured by one leg to the adjacent parts of the bars 50, 52, and 56 and have their other legs rotatably secured in the adjacent channel member 152, 154.

Figure 12:
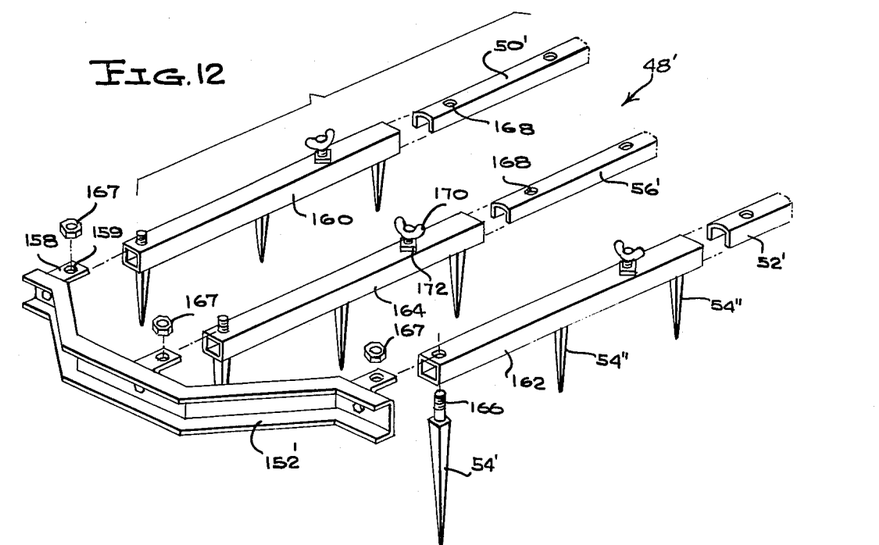
FIGURE 12 is an isometric view of a modified form of the tooth carrying bars.

In FIGURE 12, a modified form of the drag unit 48' is shown in which the bars 50', 52', 56' have extensions thereon. The extensions 160, 162 and 164, respectively, of the bars 50', 52' and 56' embody at least one tooth position in end-to-end relation with respect to each of the tooth carrying bars 50', 52' and 56'. Each of such extensions is shiftable so that the tooth 54' thereof is in longitudinal alignment with the teeth 54 on the adjacent tooth carrying bar 50', 52', or 56'.

Means is provided laterally disposed with respect to the extensions 160, 162, and 164, respectively and is contactable with the extensions 160, 162, and 164, for shifting the extensions 160, 162, and 164, simultaneously with respect to the bars 50', 52' and 56'. This means consists in a channel member 152' having lugs 158 projecting from the face of the web thereof opposite to the flanges thereof. The lugs 158 are each provided with a hole 159 through which extends the threaded reduced portion 166 of each of the teeth 54', suitable nuts 167 being employed to secure the teeth 54' to the lugs 158, with either the lugs 158 inserted into the free ends of the tooth carrying bars 50', 52', and 56', or inserted into the open ends of the extensions 160, 162, and 164. Other teeth 54" project from the bottom face of each of the extensions 160, 162, and 164 and have their upper ends secured by welding or other means to the bottom face of each of such extensions.

Fastening means is provided for releasably holding the extensions to the tooth carrying bars 50', 52' and 56'. This means consists in aligned holes 168 provided in the webs of the tooth carrying bars 50', 52', and 56', and wing bolts 170 threadedly mounted in nuts 172 welded to the upper face of each extension 160, 162, and 164. Wing bolts 170 have their shanks extending into the interior of the extensions and are insertable into and withdrawable from a selective one of the holes 168 in the complemental bar 50', 52', or 56'. It is to be understood that the other end of the bars 50', 52', and 56', are likewise provided with such extensions, either one tooth or more, and are adjustably positioned therein with the extensions connected together by a channel member complemental to the channel member 152' above described.

In FIGURE 13, a modified form of the means for attaching a draw bar to the wheel carrying element of a harrow is shown. In this embodiment of the invention, the draw bar is designated by the numeral 24' and is shown to have a stub member 34' insertable into and withdrawable from the open end and is selectively positioned within the open end of the draw bar 24' by means of a bolt and nut assembly 171 which traverses aligned holes 174 in the stub member 34' and one pair of several pairs of aligned holes 176 in the draw bar 24'. The end of the stub member 34' remote from the draw bar 24' is provided with a downwardly projecting extension 178 which terminates at its lower end in a collar half section 180 conformably shaped to fit over the wheel carrying element 28' of a harrow. Another collar section 182 is provided and bolt and nut assemblies 184 are employed to secure the collar sections 180 and 182 together about the portion of the harrow wheel carrying element 28', between spaced stop collar members 186 disposed one on each side of the assembled collar sections 180 and 182.

An important feature of the present invention resides in the arrangement of the extensions 160, 162, and 164 relative to the bars 50', 52', and 56'. They may be positioned relative to the aforesaid bars anywhere along the end portion of such bars by merely fastening the link bolts 170 into the nuts 172 which forces the free end of the link bolt 170 against the upper face or web of the respective bar 50', 52', or 56'. When the extensions 160, 162, and 164, are not employed, the threaded portions 166 of the teeth 54' extend through the holes 168 in the bars 50', 52', and 56', and through the holes 159 in the lugs 158 of the channel member 152'.

Another important feature of the present invention resides in the fabricating of the draw bars 24 and 26 with elbow shaped telescoping sections 188 and 190 (FIGURE 3) each having their telescoping juncture at a point spaced forwardly of the connection of the adjacent brace bar 42, 44. The sections 188 and 190 are adjustably secured together by conventional bolt and nut assemblies 192 and permit the positioning of the drag unit 48 as desired in transverse tandem relation with respect to the attached harrow. Other bolt and nut assemblies 194 secure the forward end portions of the draw bars 24, 26, to their associated stub members 34 in any position of adjusted movement desired to lengthen the forward end portions of such draw bars 24, 26. It is to be understood that the structure of the forward end connecting portions of the draw bar 24' may be duplicated for a complemental draw bar 26', and that the rearward end portions of such draw bars 24', 26', may be telescopingly arranged, as shown in FIGURE 3, with reference to the draw bars 24 and 26.

Another important feature of the invention resides in the criss-cross bracing of the draw bars 24 and 26 by the brace bars 42 and 44 which extend between the elbow-shaped or inclined sections 190 of the draw bars 24 and 26. This positioning of the brace bars 42 and 44 affords maximum rigidity to the draw bars 24 and 26 and they may be telescoped outwardly or inwardly to adapt them to attachment to various types of harrows without disturbing the bracing afforded by the brace bars 42 and 44.

It is to be noted that the drawbars 24 and 26 each has an angular bend in the portion which is attached to the tooth unit 48, and that the angular bends of the drawbars 24 and 26 lie in inclined planes. It will be further noted that the drawbars 24 and 26 are each extendible with each of said drawbars including a section 190 into which telescopes a section 188. Brace means is provided for maintaining the disposition of the plane of at least one drawbar with respect to the plane of another drawbar, said means comprising cross brace bars 42 and 44 which are operatively connected to the sections 190 of the drawbars 24 and 26 as shown in FIGURE 3. Upon inspection of FIGURE 3 it will be apparent that the cross brace bars 42 and 44 lie in an inclined plane.

Another feature of the invention resides in the inverted U-shaped configuration of the high carbon tooth carrying bars 50, 52, and 56. These bars have a unique resilience with adequate support by the teeth 54 to permit the long toothed carrying bars 50, 52, and 56 to be accommodated to ground swells and yet are of a structure lending itself particularly to fabrication and for the installation and replacement of the teeth 54. Such configuration affords maximum rigidity and stress-free support for the teeth 54 each of which has a threaded upper portion insertable through a punched-out hole in the web of the associated bar 50, 52, 56, or 50', 52', 56'. The teeth 54 (and 54') are easily attached to and replaced when necessary in the tooth carrying bars of the unit 48.

A further feature of the invention resides in the support of the drag unit 48 on the lower ends of the draw bars 24 and 26 by means of the sleeve 68 and sleeve 70, as shown in FIGURE 11, and the adjustment of the unit 48 about the bolt 86 as an axis which connects the spacer plates 62 and 64 to the adjacent draw bars 24, 26. This adjustment, as above explained, is made by raising or lowering the sleeve 70 by adjusting the relative position of the nut 76 on the stud 72 of each sleeve 70.

A most important feature of the invention resides in the adjustability of the teeth 54, 54' from an upright or rearwardly sloping position to a position on either side of the upright position, and in the provision of resilient support of the teeth 54, 54' so that the unit 48 may be driven in reverse movement with the teeth 54, 54' moving from the upright position to a reverse position sloping toward the harrow and serving as runners so that the unit 48 slides upwardly on the ground surface to a greater or lesser extent, depending upon soil conditions and the like.

Still another feature of the invention resides in the provision of the coil springs 135 and spool elements 137 on each of the draw bars 24 and 26 and their mode of attachment to the adjacent portion of the frame of the harrow with which the drag unit 48 is associated. The tension of such coil springs 135, applying downward pressure on the teeth 54 of the unit 48, is initially high due to the tension of the portions of the springs which are upstanding as opposed to tension of the total spring including the portion extending over the adjacent spool element 137. The springs 135, applied intermediate the draw bar span in this instance, affords lateral draw bar support and relieves draw bar stresses on turns, etc. It is to be noted that in certain soils, the assemblies of the spool elements 137 and the associated springs 135 may be omitted, if desired. Also, lesser or more spring pressure may be applied to the unit 48 by positioning the spool elements and associated springs forwardly or rearwardly on the draw bars 24 and 26 and connecting their eyebolts to other portions of the frame of the harrow.

In use, the drag unit 48 is readily attachable to and detachable from a disc harrow having a wheel carrying beam such as the element 28, 28'. The arrangement of the collar sections and the forwardly extending draw bars 24, 26, permits the pivotal movement of the draw bars about the element 28, 28' as an axis. This enables an operator of the harrow and drag attachment of the present invention to cross waterways, bridges, and ground surfaces of uneven contour by raising of the harrow and the drag unit, in unison. Frequently, soil conditions are such that the wheels of the towing vehicle will not support the harrow in an elevated position and it is necessary to leave the harrow and the drag unit 48 in ground-engaging positions when traversing a ditch or the like. The pivotal movement afforded by the connections of the draw bars 24, 26, to the harrow permit independent manual raising of the drag unit above the harrow when it is desired to enter gates too narrow for the drag unit which, in most instances, is of a wider dimension than that of the harrow.

When it is desired to reverse the harrow, it is not necessary to raise the harrow out of the ground, carrying the drag unit with it, as the movement of the teeth from the ground-engaging upright position, to a temporary reverse position toward the harrow permits backing up of the harrow and the drag unit without raising the same from the ground surface, the teeth acting as runners for the drag unit when in the reverse position. Upon resumption of forward movement, the resilient means returns the teeth 54 to the ground-engaging rearwardly sloping position without attention.

It will be seen therefore that the tooth drag attachment of the present invention is an improvement over presently used drag attachments and, with the features above described, the drag attachment is adaptable for use with any conventional harrow, has means for varying the lateral plane of its tooth supporting bars, has means for tilting the teeth to a desired position relative to the vertical, has resilient means supporting the teeth for tilting when the harrow is reversed and the drag attachment pushed rearwardly, and has means for varying the pressure of the teeth in the ground surface, as well as means for raising the drag attachment with the harrow when the latter is elevated above the ground surface.

What is claimed is:

1. The combination with a disc harrow including a frame having a forward end and a rearward end, a pair of transporting wheels positioned transversely of said frame between the forward and rearward ends thereof and normally spaced above a ground surface, a wheel-carrying element swingable about a fixed transverse pivot axis on said frame connecting said wheels together for pivotal movement of said wheels from the normal position to a position in which said wheels are in a transporting position on said ground surface, of a tooth drag attachment including at least two laterally-spaced drawbars and a tooth unit including at least two tooth-carrying bars each having a plurality of teeth arranged in spaced relation therealong and depending therefrom, said tooth unit being disposed transversely of said frame and rearwardly of the rearward end of said frame with the drawbars disposed so as to extend horizontally over and in direct contact with the frame and having one of the complemental ends adjacent said wheel-carrying element and having the other of the complemental ends overhanging the rearward end of said frame and adjacent said tooth unit, means connecting said one complemental end of said drawbars directly to said wheel-carrying element for pivotal movement about the pivot axis thereof upwardly and away from said frame, and means connecting the other of the complemental ends of said drawbars to said tooth unit for movement of said tooth unit with said drawbars, whereby movement of said wheels to a transporting position will simultaneously raise said disc harrow and said tooth drag attachment off of said ground surface and when said wheels are in their normal position said disc harrow and said tooth drag attachment may be moved either forwardly or rearwardly.

2. The combination according to claim 1 which includes in addition an extensile and retractile means which is supported on each drawbar and which is directly connected to said harrow frame.

3. The combination according to claim 1 wherein the overhanging portions of said drawbars adjacent the other of the complemental ends thereof are disposed to lie in a downwardly-inclined plane, and which includes in addition cross brace means operatively connected to said inclined portions for fixedly maintaining the laterally-spaced disposition of said drawbars.

4. The combination according to claim 1 wherein said means connecting the other of the complemental ends of said drawbars to said tooth unit comprises two laterally-spaced holding means carried by the tooth-carrying bars of said tooth unit, and a two-point fore-and-aft connecting means connecting each of the other of the complemental ends of said drawbars to an adjacent holding means.

5. The combination according to claim 4 wherein each of said two-point connecting means comprises a fixed connection to the adjacent holding means and an adjustable fixed connection to the adjacent holding means.

References Cited in the file of this patent

UNITED STATES PATENTS

| | | |
|---|---|---|
| 790,769 | Wilberg | May 23, 1905 |
| 867,865 | Yackee | Oct. 8, 1907 |
| 949,039 | Luce | Feb. 15, 1910 |
| 1,022,354 | Builta | Apr. 2, 1912 |
| 1,213,553 | Swainson | Jan. 23, 1917 |
| 1,386,584 | Payne | Aug. 2, 1921 |
| 1,552,753 | Mejstrik | Sept. 8, 1925 |
| 1,852,407 | Goeke | Apr. 5, 1932 |
| 2,524,937 | Smith | Oct. 10, 1950 |
| 2,673,434 | Babinchak | Mar. 30, 1954 |
| 2,707,909 | Ampe | May 10, 1955 |
| 2,859,577 | Presler | Nov. 11, 1958 |
| 2,960,169 | Collins | Nov. 15, 1960 |